United States Patent
Hudspeth

(10) Patent No.: US 9,437,095 B1
(45) Date of Patent: Sep. 6, 2016

(54) SAFETY SYSTEM FOR VEHICLE BALL HITCH

(71) Applicant: Weston Hudspeth, Fort Worth, TX (US)

(72) Inventor: Weston Hudspeth, Fort Worth, TX (US)

(73) Assignee: Weston Hudspeth, Fort Worth, TX (US)

( * ) Notice: Subject to any disclaimer, the term of this patent is extended or adjusted under 35 U.S.C. 154(b) by 0 days.

(21) Appl. No.: 14/735,467

(22) Filed: Jun. 10, 2015

Related U.S. Application Data

(60) Provisional application No. 62/102,563, filed on Jan. 12, 2015.

(51) Int. Cl.
*G08B 21/00* (2006.01)
*G08B 21/02* (2006.01)
*B60D 1/60* (2006.01)
*B60D 1/06* (2006.01)

(52) U.S. Cl.
CPC .................. *G08B 21/02* (2013.01); *B60D 1/06* (2013.01); *B60D 1/605* (2013.01)

(58) Field of Classification Search
CPC ........ G08B 21/02; B60D 1/06; B60D 1/605; B60D 1/36; B60D 1/62; B60D 1/015; B60D 1/065

USPC .............. 340/431, 686.1, 687; 280/507, 511, 280/416.1, 433; 70/232; 29/428; 180/271

See application file for complete search history.

(56) References Cited

U.S. PATENT DOCUMENTS

| | | | | |
|---|---|---|---|---|
| 5,421,601 A * | 6/1995 | Hinze | ....................... | B60D 1/60 280/507 |
| 5,434,552 A * | 7/1995 | Ems | ........................ | B60D 1/06 280/432 |
| 6,012,828 A * | 1/2000 | Pearce | ................... | B60Q 1/305 362/485 |
| 6,079,136 A * | 6/2000 | Kozlarek | ................ | G09F 13/04 224/519 |
| 6,412,806 B1 * | 7/2002 | Peacock | ................... | B60D 1/60 150/166 |
| 7,889,062 B1 * | 2/2011 | Albisa | ...................... | B60D 1/52 280/501 |
| 2010/0025965 A1 * | 2/2010 | Caldwell | .................. | B60D 1/60 280/507 |

* cited by examiner

*Primary Examiner* — Anh V La
(74) *Attorney, Agent, or Firm* — Eldredge Law Firm; Richard Eldrege

(57) ABSTRACT

A safety system for a trailer hitch device having a hitch member and a hitch ball. The safety system includes a body configured to peripherally surround the hitch member and the hitch ball and a fastening device attached to the body and configured to secure the body to the hitch member.

9 Claims, 4 Drawing Sheets

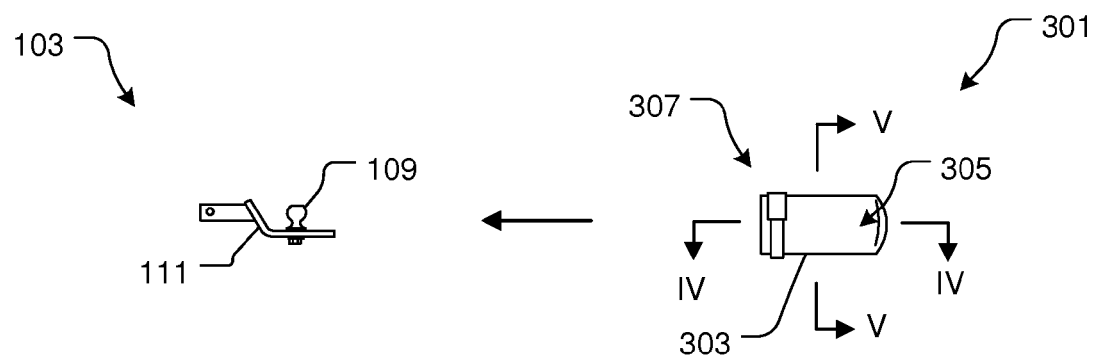
FIG. 3
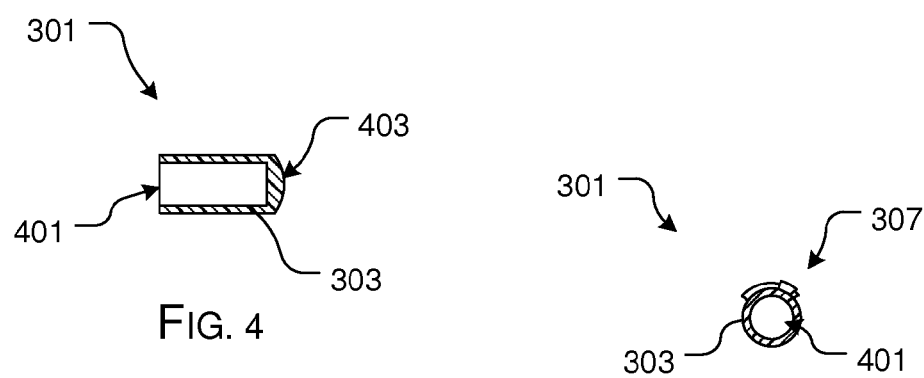
FIG. 4
FIG. 5
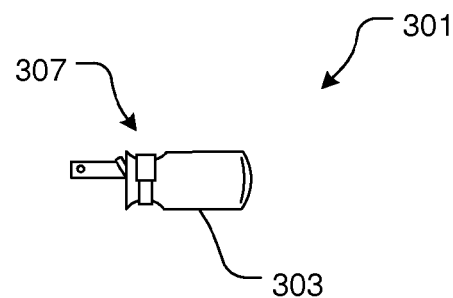
FIG. 6

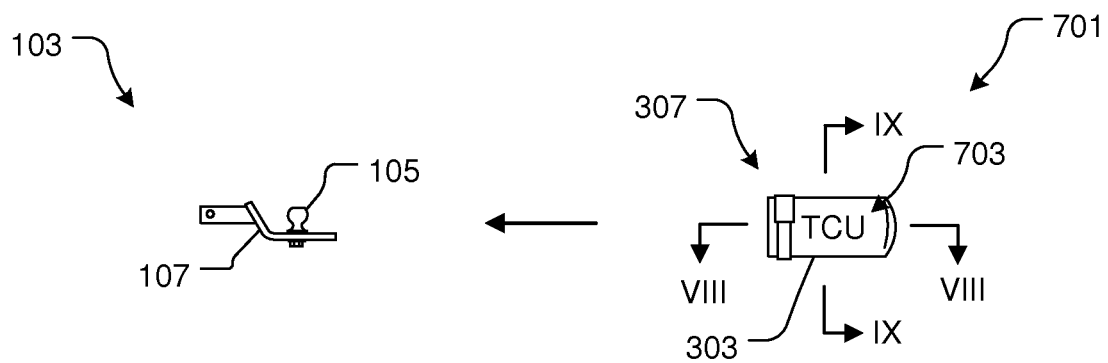
FIG. 7
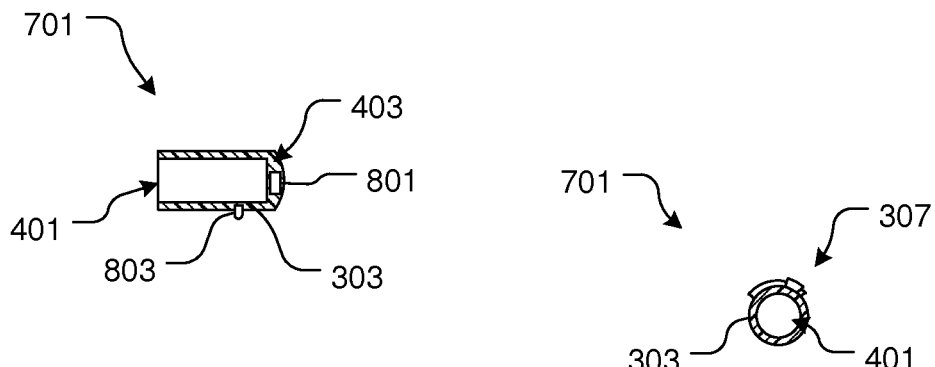
FIG. 8
FIG. 9
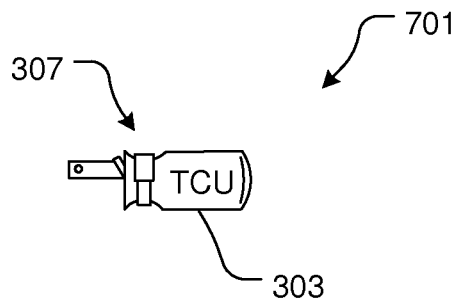
FIG. 10

SAFETY SYSTEM FOR VEHICLE BALL HITCH

BACKGROUND

1. Field of the Invention

The present invention relates generally to safety systems, and more specifically, to a safety system having a sleeve configured to fit around the ball and ball mount of a towing hitch assembly.

2. Description of Related Art

Vehicle hitch assemblies for towing are well known devices and are commonly used in the art. For example, FIG. 1 is a simplified depiction of a vehicle 101 having a hitch towing device 103 configured to engage with a receiver 105 of the vehicle body 107. As shown in FIG. 2, when assembled, a portion of towing device 103 extends outwardly from the receiver 105, which in turn allows the ball 109 of device 103 to engage with a trailer coupler (not shown) of a trailer.

A common problem associated with device 103 is persons coming into contact with the device when installed. For example, persons moving around the device 103 may not visually see the device (e.g., dark night) and cause injury to a leg or cause the party to fall over. The injuries to the leg could be minor such as bruising or on the other hand life-threatening. Accordingly, there is a need for a device that will warn the party of the presence of the device 103 and/or protect the party from injury caused by inadvertently coming into contact with the device.

Although great strides have been made in the area to help assisted persons, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is a safety device in accordance with a preferred embodiment of the present application;

FIG. 4 is a cross-sectional view of the safety device of FIG. 3 taken at IV-IV;

FIG. 5 is a cross-sectional view of the safety device of FIG. 3 taken at V-V;

FIG. 6 is the side view of the safety device of FIG. 3;

FIG. 7 is a safety device in accordance with an alternative embodiment of the present application;

FIG. 8 is a cross-sectional view of the safety device of FIG. 7 taken at VIII-VIII;

FIG. 9 is a cross-sectional view of the safety device of FIG. 7 taken at IX-IX;

FIG. 10 is the side view of the safety device of FIG. 7; and

Figure 1:
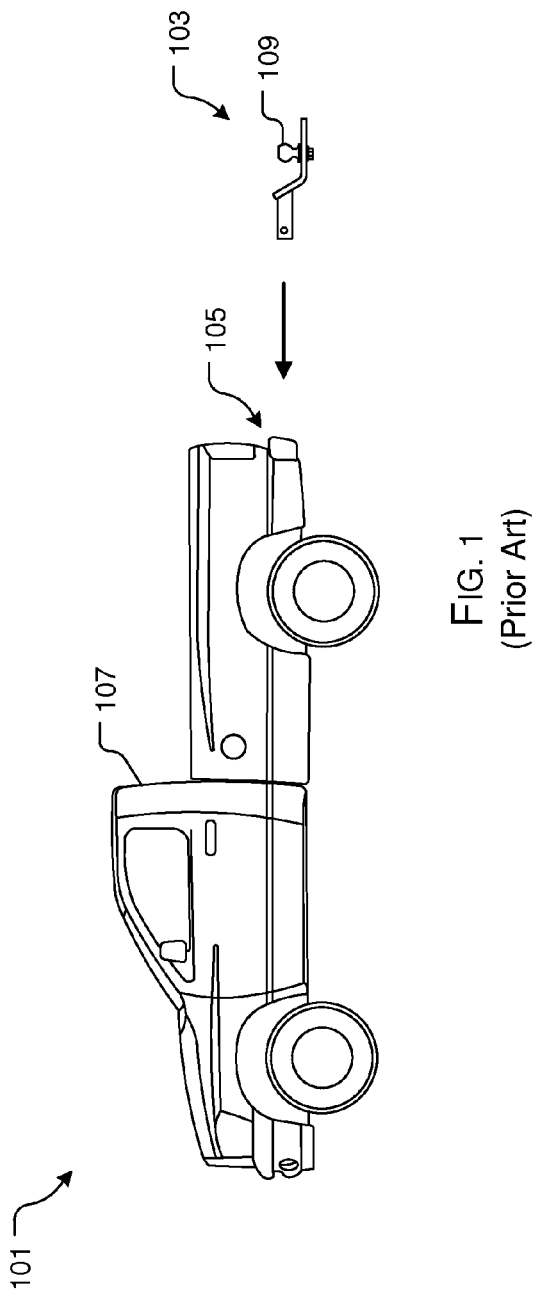
FIGS. 1 and 2 are simplified side views of a conventional vehicle with a hitch towing device.
Figure 2:
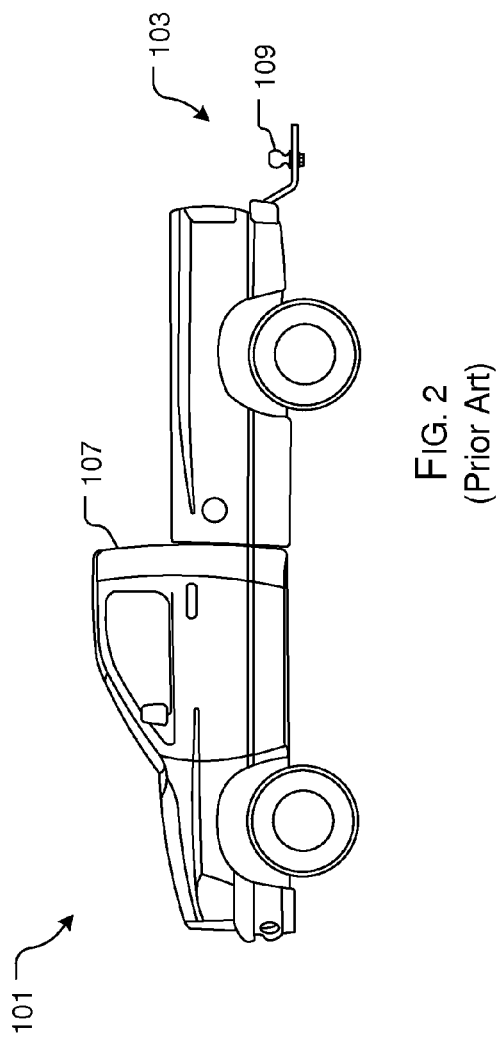

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional trailer hitches. Specifically, the system and method of the present application provides rapid and effective means will warn a party of the presence of the trailer hitch device and/or protect the party from injury caused by inadvertently coming into contact with the trailer hitch device. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 3-6 depicts various views of a safety system and method of use in accordance with a preferred embodiment of the present application. It will be appreciated that system 301 overcomes one of more of the above-listed problems commonly associated with the conventional trailer hitch devices.

In the contemplated embodiment, system 301 includes one or more of body 303 having an outer surface 305. As shown in FIGS. 4-6, body 303 forms a circular shape and a cavity 401 configured to receive the ball 105 and a ball member 111 therein.

In the preferred embodiment, body 303 has a thickness and is composed of a cushioned material configured to reduce, if not eliminate, harm to the leg as the person comes into contact therewith. As shown in FIG. 4, an optional feature includes adding additional padding at end 403 that protects the leg from a head-on collision with the ball and ball member. In one contemplated embodiment, the body is composed of a foam material; however, alternative embodiments could include other types of padding materials.

System 301 is further provided with a fastening means 307 configured to secure the body 303 to the ball member 111. These features are shown in FIG. 6, wherein the fastening means 307 is tightened, which in turn secures the body to the ball member.

In one contemplated embodiment, the fastening means 307 is a string that wraps around the periphery of the body; however, it will be appreciated that a strap with buckle and/or other similarly suitable means could be used to secure the body to the ball member.

The method of assembly includes sliding the body over the ball and ball member and thereafter securing the body via the fastening means.

Referring now to FIGS. 7-10 in the drawings, a safety system 701 is shown. It will be appreciated that system 701 is substantially similar in form and function to system 301 and incorporates the features discussed herein.

In this embodiment, system 701 is provided with an indicia 703 placed on the outside surface of the body. Further, the system is provided with a warning system 801 disposed within the thickness of the body.

Figure 11:
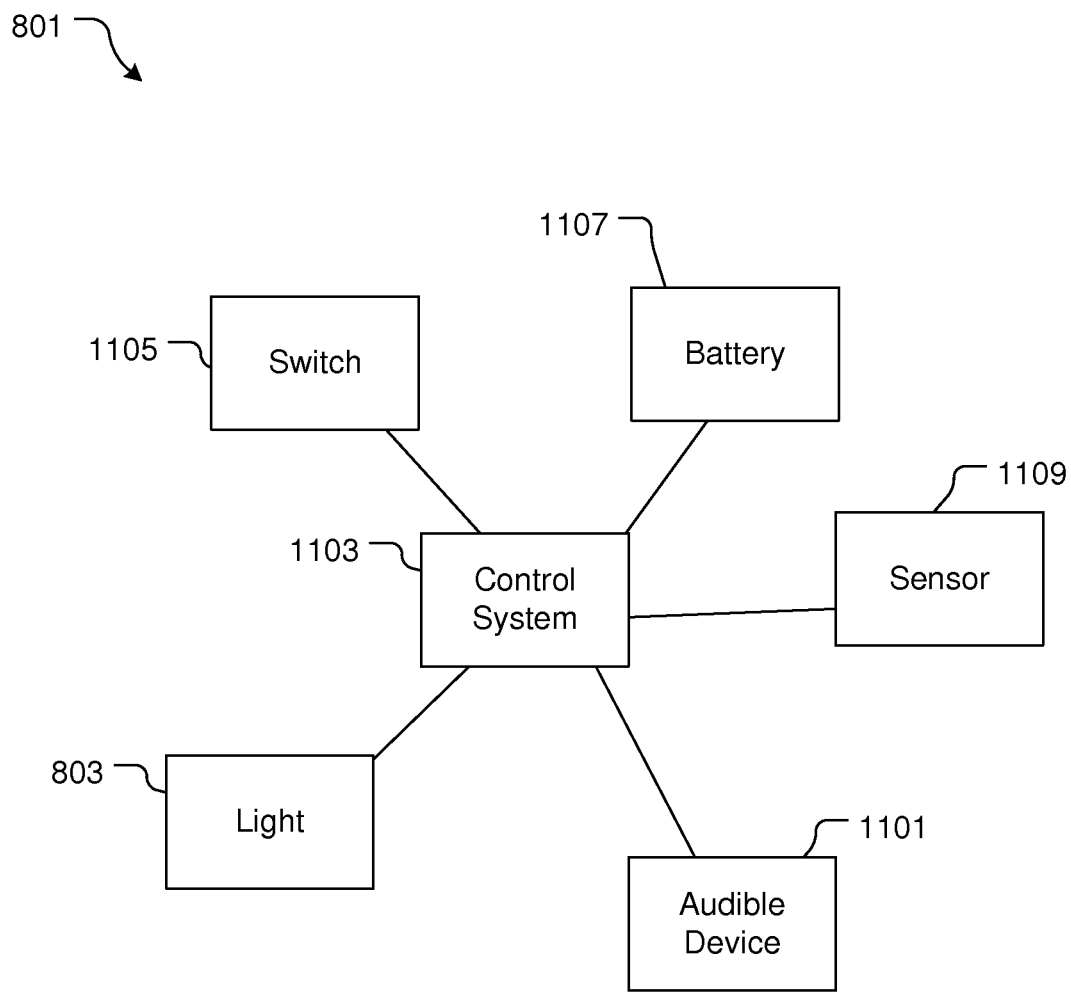
FIG. 11 is a simplified schematic of the control system of the safety device of FIG. 7.

In the contemplated embodiment, system 701 provides warning, either a visual light 803 and/or audible warning 1101 to provide the party adequate warning of the location of the hitch device. As shown in FIG. 11, the system 701 includes a control system 1103, a switch 1105, a battery 1107, and/or a sensor 1109. In one embodiment, sensor 1109 could be used to determine the proximity of the party and activate the warning system, accordingly.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A safety system for a trailer hitch device having a hitch member and a hitch ball, the safety system comprising:
   a pliable cylindrical body configured to peripherally surround the hitch member and the hitch ball;
   a strap attached to a partial section of an outer perimeter surface of the pliable cylindrical body and configured to reduce a diameter of a portion of the pliable cylindrical body such that an inner surface of the pliable cylindrical body comes into contact with an outer surface of the hitch member, which in turn secures the body to the hitch member; and
   a warning system disposed within a thickness of the pliable cylindrical body.

2. The safety system of claim 1, wherein the body is composed of a cushion material.

3. The safety system of claim 1, the warning system, comprising:
   a control system and a light;
   wherein the light is configured to provide visual warning.

4. The safety system of claim 1, the warning system, comprising:
   a control system and an audible device;
   wherein the audible device is configured to provide audible warning.

5. The safety system of claim 1, the warning system, comprising:
   a control system and a motion detector;
   wherein the motion detector activates the control system.

6. A method to reduce harm to a person coming into contact with a trailer hitch device having a hitch member and a hitch ball extending from a vehicle, the method comprising:
   providing the system of claim 1;
   peripherally surrounding the pliable cylindrical body around the hitch member and the hitch ball; and
   securing the pliable cylindrical body to the hitch member via the strap.

7. The method of claim 6, wherein the feature of securing the pliable cylindrical body to the hitch member includes the step of wrapping and tightening the strap around a cylindrical body of the pliable cylindrical body.

8. The method of claim 6, further comprising:
   warning the person with a warning device secured to the pliable cylindrical body.

9. The method of claim 6, wherein the feature of warning the person includes using a warning light that provides visual presence of the trailer hitch device.

* * * * *